United States Patent
Yaginuma et al.

(10) Patent No.: US 10,185,852 B2
(45) Date of Patent: Jan. 22, 2019

(54) TAG READING DEVICE

(71) Applicant: TOSHIBA TEC KABUSHIKI KAISHA, Tokyo (JP)

(72) Inventors: Jun Yaginuma, Izunokuni Shizuoka (JP); Kouichi Sano, Shizuoka Shizuoka (JP); Sunao Tsuchida, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/625,112

(22) Filed: Jun. 16, 2017

(65) Prior Publication Data

US 2018/0032770 A1 Feb. 1, 2018

(30) Foreign Application Priority Data

Jul. 26, 2016 (JP) ................... 2016-146161

(51) Int. Cl.
*G06K 7/00* (2006.01)
*G06K 7/10* (2006.01)
*H01Q 1/22* (2006.01)
*H01Q 3/04* (2006.01)
*H01Q 21/28* (2006.01)

(52) U.S. Cl.
CPC ..... *G06K 7/10366* (2013.01); *G06K 7/10316* (2013.01); *H01Q 1/2216* (2013.01); *H01Q 3/04* (2013.01); *H01Q 21/28* (2013.01)

(58) Field of Classification Search
CPC .......... G06K 7/10336; G06K 7/10316; G06K 17/00; G06K 7/10346

USPC ................. 235/375, 385, 439, 383
See application file for complete search history.

(56) References Cited

U.S. PATENT DOCUMENTS

| | | | |
|---|---|---|---|
| 3,708,655 A * | 1/1973 | Schanne | G06K 7/10871 235/462.03 |
| 8,384,521 B2 | 2/2013 | Matsen et al. | |
| 9,858,769 B2 | 1/2018 | Hattori | |
| 2007/0221727 A1* | 9/2007 | Reznik | G06Q 10/08 235/383 |

FOREIGN PATENT DOCUMENTS

| JP | 2011-100235 | 5/2011 |
|---|---|---|
| JP | 2012-127647 A | 7/2012 |

OTHER PUBLICATIONS

Japanese Office Action filed Jul. 18, 2017 in counterpart Japanese Patent Application No. 2016-146161 (6 pages) (with translation).

* cited by examiner

*Primary Examiner* — Jamara Franklin
(74) *Attorney, Agent, or Firm* — Patterson & Sheridan, LLP

(57) ABSTRACT

A wireless tag reading device includes a chamber in which an article having a wireless tag attached thereto can be stored. A first antenna is provided for outputting a signal for reading information from the wireless tag attached to the article stored in the chamber. A second antenna is also provided for outputting the signal for reading information from the wireless tag. A first moving mechanism is configured to change a distance between the wireless tag and the first antenna during a reading process for reading information from the wireless tag in the chamber.

19 Claims, 7 Drawing Sheets

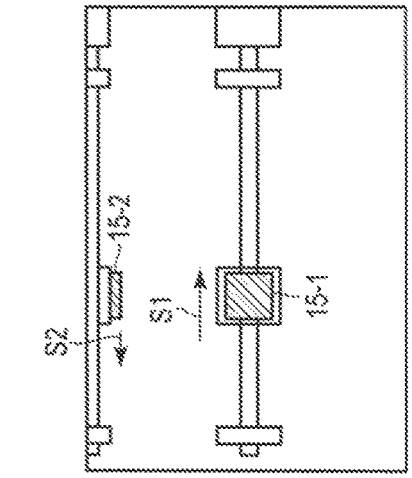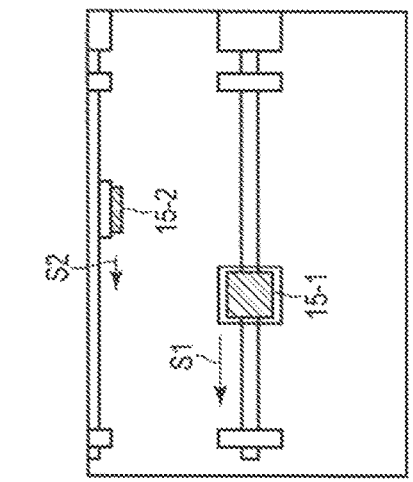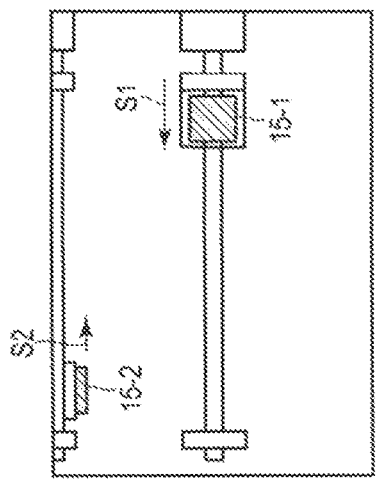

TAG READING DEVICE

This application is based upon and claims the benefit of priority from Japanese Patent Application No. 2016-146161, filed Jul. 26, 2016, the entire contents of which are incorporated herein by reference.

FIELD

An embodiment described herein relates generally to a tag reading device which reads information from a wireless tag which is attached to an article.

BACKGROUND

A tag reading device reads article information stored in a wireless tag (e.g., a RFID tag) which is attached to an article or articles. The tag reading device can perform inventory tracking or inventory loading and unloading management based on the article information that is read. There are mobile types and stationary (fixed) types of tag reading devices. For example, a tag reading device of the stationary type has a plurality of flat antennas installed on a gate and reads information from a wireless tag attached to the articles passing through the gate.

In such a tag reading device with a gate, a distance from an antenna to an article can be long, and it thus may be necessary to increase the intensity of radio waves emitted by the antenna so as to reliably read the wireless tags. On one hand, if the intensity is increased, there is a possibility that wireless tags will be inadvertently read from beyond an intended reading region. Therefore, it becomes necessary to keep other articles with tags away from the intended reading region or to occupy a wider work area, with countermeasures to limit inadvertent reading. On the other hand, in a case where the emitted radio wave intensity is decreased, there is a potential problem with missed readings occurring with respect to wireless tags on articles tightly packed together within boxes or the like.

Accordingly, in inventory tracking and/or loading and unloading management applications, there is a demand for a device which can reliably read article information from wireless tags attached to a plurality of articles without unnecessarily increasing the intensity of the radio wave emitted from the antenna.

BRIEF DESCRIPTION OF THE DRAWINGS

FIGS. 6A, 6B, 6C, and 6D are plan views for explaining aspects of movement control for Configuration Example 2.

DETAILED DESCRIPTION

In general, according to one embodiment, a wireless tag reading device includes a chamber in which an article having a wireless tag attached thereto can be stored. A first antenna is provided for outputting a signal for reading information from the wireless tag attached to the article stored in the chamber. A second antenna is also provided for outputting the signal for reading information from the wireless tag. A first moving mechanism is configured to change a distance between the wireless tag and the first antenna during a reading process for reading information from the wireless tag in the chamber.

Hereinafter, an example embodiment will be described with reference to drawings.

Figure 1:
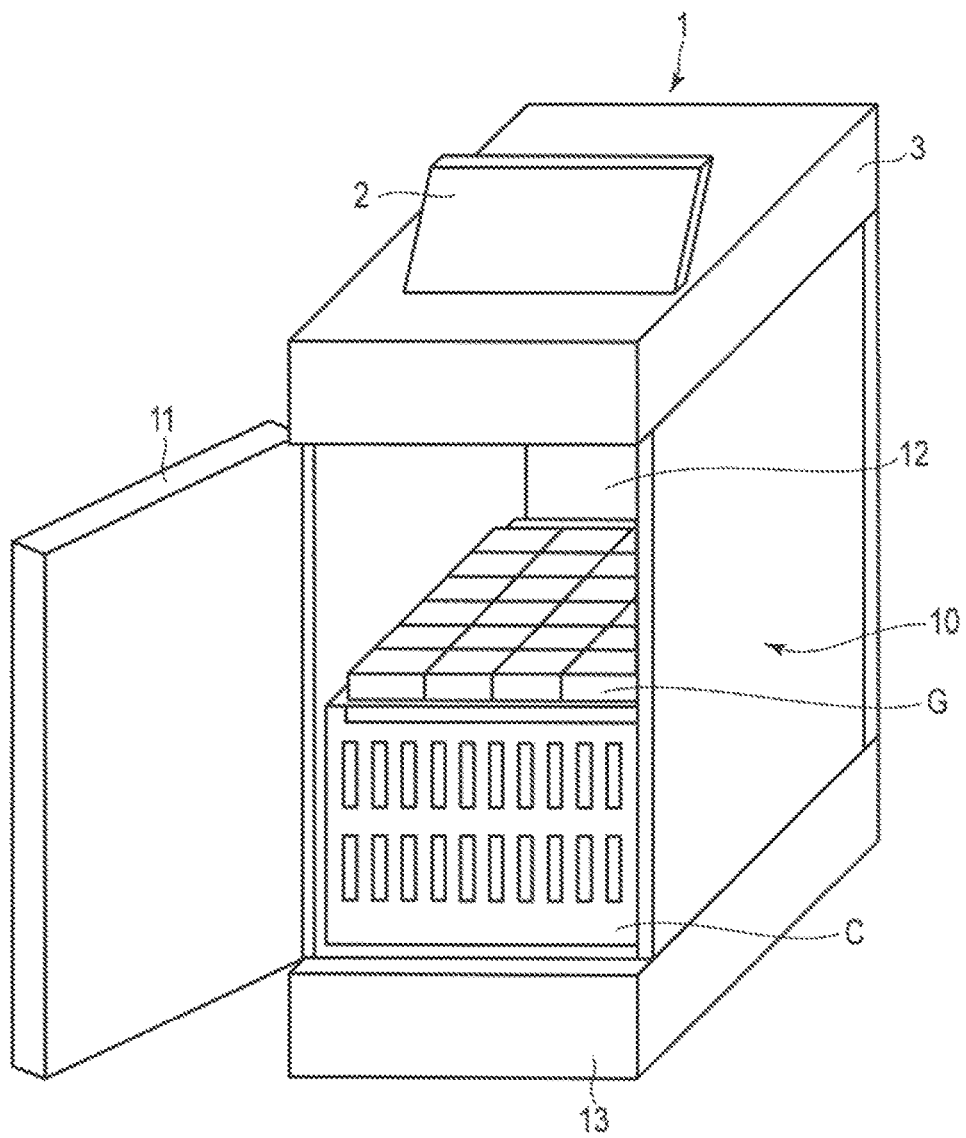
FIG. 1 is a perspective view depicting an exterior configuration of a tag reading device according to an embodiment.

FIG. 1 is a perspective view depicting an exterior configuration of a tag reading device or a tag reader 1. The tag reading device 1 is installed and used in, for example, a warehouse. The tag reading device 1 includes a reading device 3 for reading a wireless tag that is attached to an article G. In this example, the wireless tag is a Radio Frequency Identification (RFID) tag, particularly an RFID tag operating in UHF bandwidth. The tag reading device 1 also includes an information processing device 2 which operates the reading device 3 and displays a tag reading result or the like.

Although additional details of the reading device 3 will be described later, here it is noted that the reading device 3 blocks radio waves from outside (the "outside world") of the reading device 3 and also plays a role as a storage room or chamber for cargo C (e.g., one or items of cargo).

The reading device 3 is connected to the information processing device 2 through a cable (not shown) or the like.

Next, the reading device 3 will be described.

Figure 2:
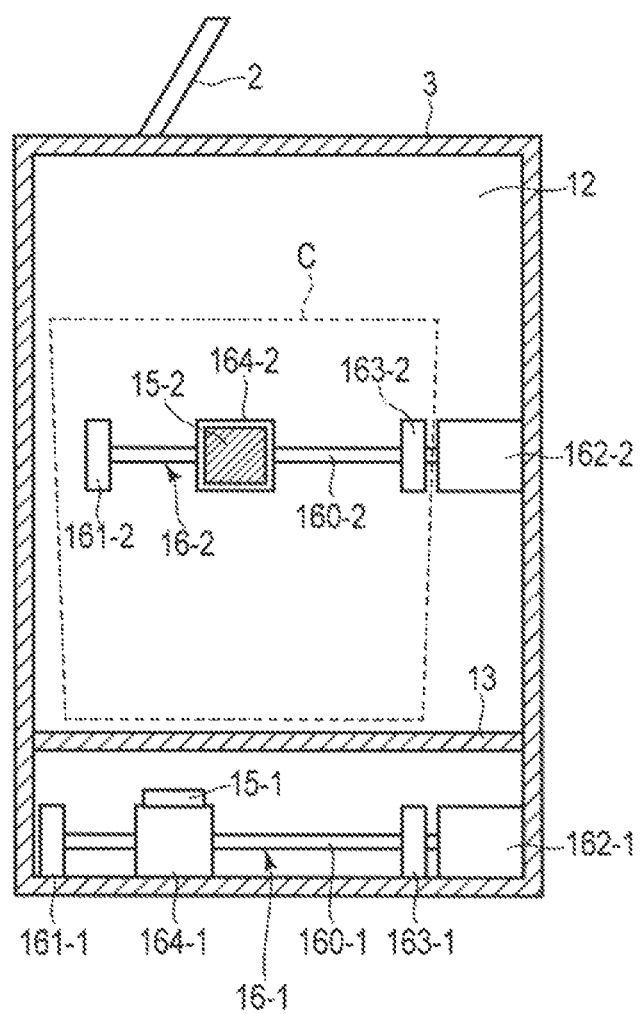
FIG. 2 is a schematic cross-sectional view of a tag reading device according to an embodiment.

An exterior of the reading device 3 includes a case 10 and an opening/closing lid (lid) 11 covering an opening in case 10. The opening in the case 10 is a gate to the cargo C in the case 10. FIG. 1 shows the reading device 3 when the lid 11 is in an open state. FIG. 2 is a schematic cross-sectional view of the reading device 3 when the lid 11 is in a closed state.

In this example, the case 10 is formed in a box-like shape and has a depth larger than a width. A reading room (or storage room) 12 is formed inside of the case 10 and can hold the cargo C.

Outer walls of the case 10 and the lid 11 are formed by a radio wave reflecting material such as a metal plate and a molding material or a radio wave absorber for absorbing a radio wave. Inner walls of the case 10 and the lid 11 may be covered with a radio wave reflecting material or a radio wave absorber or may be covered with other materials.

The lid 11 can be drawn open in front. A worker can insert or remove the cargo C via the opening in the case 10 when the lid 11 is open to provide access to the reading room 12.

In the reading room 12, the cargo C can be placed on a pedestal 13. The pedestal 13 is formed of an insulative (i.e., radio wave transparent) plate-shaped material such as wood or glass. The pedestal 13 is supported so there is a fixed gap between the case 10 and the pedestal 13.

A plurality of RFID antennas 15 (e.g., the two RFID antennas 15-1 and 15-2 in FIG. 2) are provided in the reading room 12 as a RFID antenna unit for reading and writing information of the RFID tag. Here, antenna devices for both transmission and reception, each including a planar patch antenna accommodated in a rectangular parallelepiped case, are used as the RFID antennas 15-1 and 15-2.

The RFID antennas 15-1 and 15-2 are connected to a distributor (not shown) via a coaxial cable. The distributor is connected to a reader/writer device (not shown) having a reader/writer unit and a port for an antenna via a coaxial cable. The reader/writer device is preferably installed at a position where reading and writing of information from/to the RFID tag will not be disrupted. Specifically, the reader/writer device may be provided in an outer periphery of the case 10 outside of the reading room 12 or inside of the tag reading device 1. If the reader/writer device is inside of the reading room 12, the reader/writer device can be provided in free space such as the gap between the pedestal 13 and a bottom of the case 10 or space near a side surface of the case 10. When the reader/writer device is placed inside reading room 12, the reader/writer device is preferably covered with a protective material, such as the radio wave absorber, so as to remove or reduce the influence of radio waves on the reader/writer device or the influence of radio waves from the reader/writer device on the outside environment.

The RFID antenna 15-1 is movable inside the reading room 12 by a moving mechanism 16-1 disposed in the pedestal 13. In addition, the RFID antenna 15-2 is movable inside the reading room 12 by a moving mechanism 16-2 disposed in free space inside of the case 10. The moving mechanism 16-2 is disposed in free space inside of the case 10, but is not necessarily exposed within the reading room 12; however, the moving mechanism 16-2 is depicted in FIG. 2 so that a basic configuration is easy to understand. In addition, FIG. 2 depicts an outer shape of the cargo C so a general relationship between the RFID antennas 15-1 and 15-2 and the cargo C can be understood, but the specific outer shape of cargo C is not necessarily relevant.

The moving mechanisms 16-1 and 16-2 can change a communication distance between the RFID tag and the RFID antennas 15-1 and 15-2 by moving the RFID antennas 15-1 and 15-2. It is also possible to provide a configuration for changing the communication distance without moving the RFID antennas 15-1 and 15-2. For example, a configuration for changing the direction and the output range of a radio wave emitted from the RFID antennas 15-1 and 15-2 could be provided.

The moving mechanism 16-1 includes a direct motion mechanism comprising a screw shaft 160-1, a bearing 161-1 for the screw shaft 160-1, a stepping motor 162-1 as a rotational power source, a coupling 163-1 for transmitting rotational power to the screw shaft 160-1, and a moving stage 164-1 integrally formed with a ball screw nut engaged with the screw shaft 160-1.

One end of the screw shaft 160-1 is supported by the bearing 161-1, and the other end is supported by the coupling 163-1. The screw shaft 160-1 is configured to be rotatable about a horizontal (left-right page direction in FIG. 2) axis. In addition, an output shaft of the stepping motor 162-1 is connected to the other end of the screw shaft 160-1 in the coupling 163-1. With this configuration, rotational power of the stepping motor 162-1 is transmitted from the output shaft to the screw shaft 160-1 via the coupling 163-1.

The moving stage 164-1 has a through hole passing through a main body portion and a ball screw nut of the screw shaft 160-1 is embedded in the through hole. The moving stage 164-1 thus moves forward and backward along the screw shaft 160-1 with the rotation of the screw shaft 160-1. Since a metallic ball (e.g., steel ball bearing) is interposed in the screw portion between the screw shaft 160-1 and the ball screw nut at the time of movement in the moving stage 164-1, smooth movement is possible.

In this manner, a rotational movement of a stepping motor 162 is changed to a linear motion, so that linear movement of the moving stage 164-1 is possible.

It can be assumed that the moving stage 164-1 slidably moves along a linear guide (not shown) provided so that the main body of the moving stage 164-1 does not turn with the rotation of the screw shaft 160-1. Accordingly, the moving stage 164-1 linearly moves along the screw shaft 160-1 while keeping a constant orientation.

On an upper surface of the main body of the moving stage 164-1, the RFID antenna 15-1 is fixed with a reading surface thereof facing upward. The reading surface is a surface from which a planar patch antenna emits a radio wave. Accordingly, the RFID antenna 15-1 emits a radio wave having high intensity toward a front of the reading surface, that is, an upward direction along which the cargo C is placed.

The moving RFID antenna 15-1 is connected to a distributor 36 (shown in FIG. 3) using a flexible coaxial cable. The distributor 36 is connected to a reader/writer unit 31 (shown in FIG. 3).

Although not particularly required in the present embodiment, a sensor may be provided on a moving path of the moving stage 164-1 so that positional corrections may be performed in order to improve positioning accuracy of the moving stage 164-1. For example, a sensor (e.g., a micro switch, a proximity sensor, or the like) may be provided at a movement start position and a movement end position of the moving stage 164-1 and movement of the moving stage 164-1 may be stopped or the moving amount may be adjusted when the movement/position of the moving stage 164-1 is detected by the sensor so as to make positioning more reliable.

With the above configuration, when the stepping motor 162-1 rotates in one direction, the moving stage 164-1 moves to the right in FIG. 2 (away from the lid 11) on the screw shaft 160-1 and when the stepping motor 162-1 rotates in the reverse direction, the moving stage 164-1 retreats to the left in FIG. 2 (toward the lid 11) on the screw shaft 160-1. The RFID antenna 15-1 moves in conjunction with the moving stage 164-1 with the reading surface facing upward. Hereinafter, a direction of rotation of the stepping motor 162-1 will be referred to as forward rotation when the moving stage 164-1 moves the screw shaft 160-1 to the right in FIG. 2 and the opposite rotational direction of the stepping motor 162-1 will be referred to as reverse rotation.

The moving mechanism 16-1 has a configuration in which the RFID antenna 15-1 moves forward and backward (toward and away from the lid 11) in a longitudinal (depth) direction of the cargo C. In addition, the moving mechanism 16-1 is disposed so that the RFID antenna 15-1 moves forward and backward in a vertical plane or in a periphery of the vertical plane including a center line in a lateral (width) direction of the cargo C placed in the reading room 12. In addition, in the longitudinal (depth) direction of the cargo C, the RFID antenna 15-1 can move forward and backward at least from one end of the cargo C to the other end (entire range).

The moving mechanism 16-2 comprises a direct motion mechanism having a screw shaft 160-2, a bearing 161-2 of the screw shaft 160-2, a stepping motor 162-2 as a rotation power source, a coupling 163-2 for transmitting rotation power to the screw shaft 160-2, and a moving stage 164-2 integrally formed with a ball screw nut engaged with the screw shaft 160-2.

The parts of moving mechanism 16-2 are given the same name as parts of the moving mechanism 16-1, and detailed explanations will be omitted.

The moving mechanism 16-2 is disposed so that a moving direction of the RFID antenna 15-2 is parallel to a moving direction of the RFID antenna 15-1 caused by the moving mechanism 16-1. Accordingly, the RFID antenna 15-2 moves forward and backward along the longitudinal (depth) direction of the cargo C in the same manner as the RFID antenna 15-1. In addition, the moving mechanism 16-2 is disposed so that the RFID antenna 15-2 moves forward and backward at a height of about half way up the cargo C placed in the reading room 12.

In addition, the screw shaft 160-2 of the moving mechanism 16-2, shown in FIG. 2, is shorter than the screw shaft 160-1 of the moving mechanism 16-1. That is, a movable length of the RFID antenna 15-2 is shorter than the movable length of the RFID antenna 15-1.

However, in some examples, the movable length of the RFID antenna 15-1 caused by the moving mechanism 16-1 may be shorter than the movable length of the RFID antenna 15-2 caused by the moving mechanism 16-2.

A plurality of the RFID antennas 15-1 and 15-2 can be connected to the reader/writer device via the distributor 36 and can simultaneously emit radio waves. For this reason, when radio waves are simultaneously emitted from the RFID antennas 15-1 and 15-2, the radio waves from the RFID antennas 15-1 and 15-2 (and reflected waves from the case 10 or the like) may form interference patterns in the reading room 12. It is thus possible to communicate with the RFID tags in the reading room 12 using this composite wave, in particular at positions of constructive interference.

In addition, the RFID antennas 15-1 and 15-2 are moved by the moving mechanisms 16-1 and 16-2, respectively. For this reason, a place at which radio wave intensity is strong can be constantly changed. Therefore, it is possible to read RFID tags using the composite wave as continuously modified by movement of the RFID antennas 15-1 and 15-2 even in a case where many tagged articles are stacked, overlapped, and/or the various RFID tags are oriented toward various directions. Accordingly, it is possible to limit missed RFID tags.

Particularly, the RFID antennas 15-1 and 15-2 can be controlled to have different reciprocating cycles over respective movable lengths when the RFID antennas 15-1 and 15-2 are moved by the moving mechanisms 16-1 and 16-2. Accordingly, even if the RFID antennas 15-1 and 15-2 are reciprocated many times, the reflected waves can continuously compose different patterns. Even when a plurality of articles are accommodated in the reading room 12, the reading device 3 can then reliably and collectively read information from the RFID tags attached to the articles. In addition, since the RF environment inside the reading room 12 can be blocked from radio waves (e.g., noise) from the outside by covering an outer surface of the reading device 3 (the case 10 and the lid 11) with a radio wave reflecting member, it is possible to prevent erroneous readings caused by noise or the like.

Figure 3:
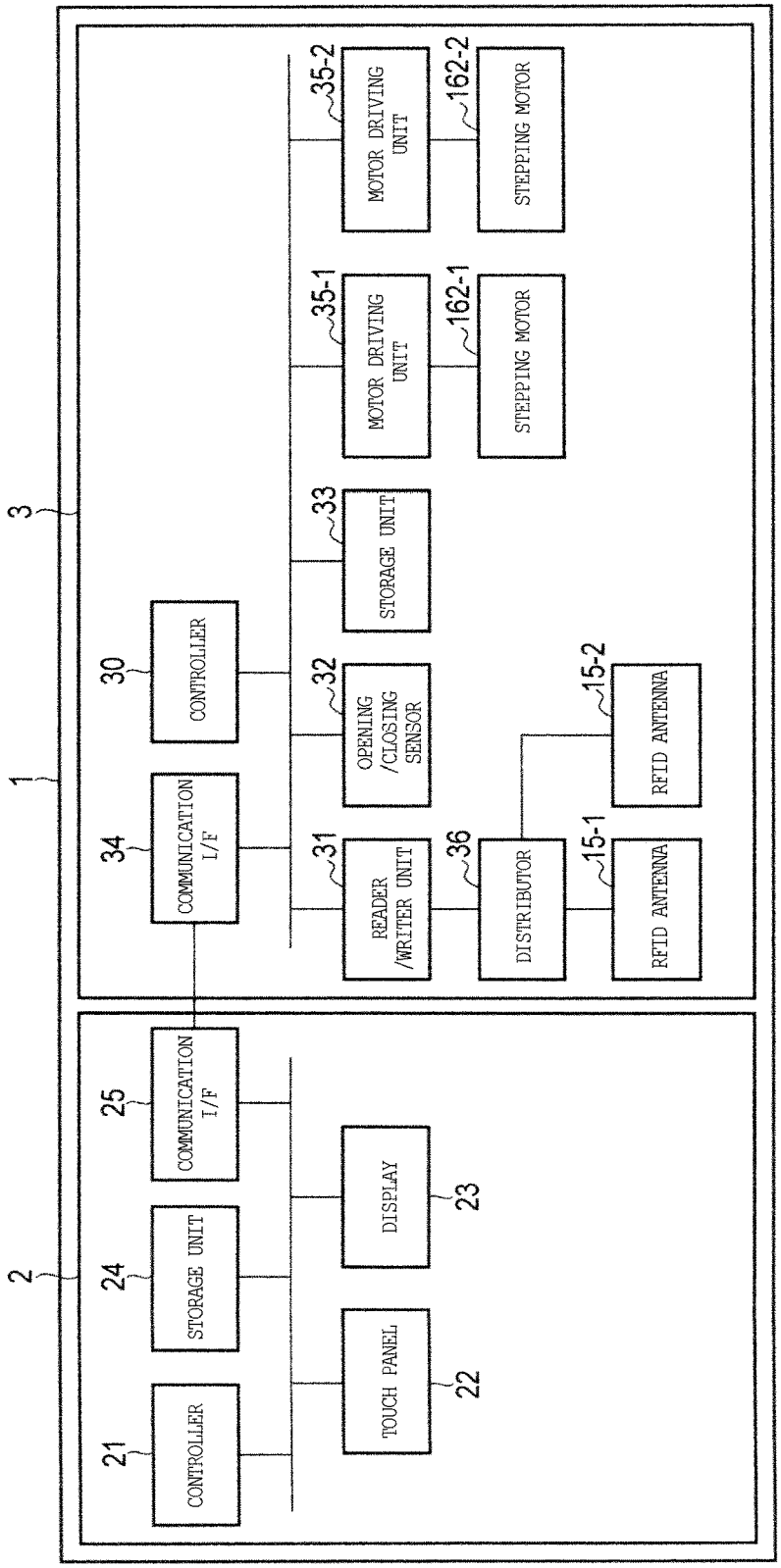
FIG. 3 is a block diagram depicting a hardware configuration of a tag reading device according to an embodiment.

Next, hardware configurations of the information processing device 2 and the reading device 3 will be described. FIG. 3 is a block diagram showing the hardware configurations of the information processing device 2 and the reading device 3.

The information processing device 2 includes a controller 21. In some examples, controller 21 may be a computer having a Central Processing Unit (CPU), a Read Only Memory (ROM), a Random Access Memory (RAM), and the like. Here, the ROM stores various programs or data to be executed or used by CPU. The RAM temporarily stores data or programs when CPU executes various programs.

The controller 21 executes the data processing related to loading and unloading of the article using information read from the RFID tag on the article in the reading device 3. A touch panel 22 and a display 23 are connected to the controller 21 via various input/output circuits (not shown).

In addition, a storage unit 24 and a communication I/F 25 are connected to the controller 21 via various input/output circuits (not shown).

The storage unit 24 is a storage device including a nonvolatile storage medium such as a hard disk drive (HDD) or a solid-state drive (SSD). The storage unit 24 stores various programs or data related to operations of the tag reading device 1. As data stored in the storage unit 24, there is, for example, an article master list in which article information on each of the articles is registered in correlation with an article code for identifying the article. The article information includes, for example, an article name and price of the corresponding article. The communication I/F 25 is an interface for performing transmission and reception of various kinds of data to and from the reading device 3.

The reading device 3 includes a controller 30. In some examples, the controller 30 may be a computer having a CPU, ROM, RAM, and the like. In such instances, the ROM stores various programs or various kinds of data executed by CPU and the RAM temporarily stores data or programs when CPU executes various programs.

In addition, the reader/writer unit 31, an open/closed sensor 32, a storage unit 33, a communication I/F 34, motor driving units 35-1 and 35-2, and the like are connected to the controller 30 via various input/output circuits (not shown).

The reader/writer unit 31 communicates with the RFID tag attached to the article and performs transmission and reception of data through the distributor 36 and RFID antennas 15-1 and 15-2 under an instruction from the controller 30. The distributor 36 permits simultaneously operation of a plurality of RFID antennas 15-1 and 15-2.

Here, communication with the RFID tag is divided into the following two cycles.

For example, in a case where the RFID tag is a passive type not having a battery, communication with the RFID tag is as follows.

The first cycle is a reading cycle in which an unmodulated carrier wave is amplified and emitted from the RFID antennas 15-1 and 15-2 as an interrogation wave, RFID tag information, such as an identification code, is loaded on a reflected wave (response wave) from a RFID tag in the response range is received by the RFID antennas 15-1 and 15-2, the tag information is demodulated from the carrier wave, and the demodulated tag information is transmitted to the controller 30.

The second cycle is a writing cycle in which a carrier wave is modulated with a writing signal from the controller 30, the carrier wave after modulation is amplified and emitted from the RFID antennas 15-1 and 15-2 for writing information to a RFID tag in the response range, and a received result is sent to the controller 30. The RFID tag receives the radio wave from the RFID antennas 15-1 and 15-2 using an antenna of the RFID tag, activates a communication chip, and then loads the tag information stored in a memory on the reflected wave. In addition, the RFID tag performs writing of information into a write area in the memory based on a write command.

The motor driving unit 35-1 is a driver circuit for operating the stepping motor 162-1. A pulse signal for rotating the stepping motor 162-1 by a predetermined angle (e.g., step angle) is output under the control of the controller 30. The motor driving unit 35-2 is a driver circuit for operating the stepping motor 162-2. A pulse signal for rotating the stepping motor 162-2 by a predetermined angle (e.g., step angle) is output under control of the controller 30. Since the motor driving units 35-1 and 35-2 respectively operate each of the stepping motors 162-1 and 162-2, it is possible to separately control moving speeds and moving directions of the RFID antennas 15-1 and 15-2.

The open/closed sensor 32 is a sensor device for detecting an open/close state of the lid 11. The open/closed sensor 32 outputs open/close state information indicating the state of the lid 11 to the controller 30. The open/closed sensor 32 can be realized, for example, by a micro switch or a magnetic sensor provided in a contact part between the case 10 and the lid 11 or a hinge mechanism of the lid 11. In addition, in a case where the reading room 12 is dark when lid 11 is closed, the open/closed sensor 32 can be realized by a light sensor provided in the reading room 12.

The storage unit 33 is a storage device including a nonvolatile storage medium such as HDD or SSD. The storage unit 33 stores various programs or various kinds of data related to an operation of the reading device 3.

The communication I/F 34 is an interface for performing transmission and reception of various kinds of data to and from the information processing device 2.

Next, functional configurations of the information processing device 2 and the reading device 3 will be described.

The controller 21 (CPU) of the information processing device 2 realizes a display control function, an input reception function, a communication control function, and a sales registration function by cooperating with programs stored in the storage unit 24.

The display control function controls the display 23 and displays various screens on the display 23. For example, the display control function displays a screen having a button or the like for instructing a reading start of the article code (RFID tag) (hereinafter, referred to as "reading start button") or a button or the like for instructing a reading end (hereinafter, referred to as "reading end button"). In addition, the display control function reads the article information corresponding to the article code from the article master list and displays an article name, a type, a weight, and the like of the article based on the article code transmitted from the reading device 3.

The input reception function receives an operator input via the touch panel 22. For example, the input reception function outputs instruction information corresponding to the operator input to the controller 21.

The communication control function controls the communication I/F 25 and transmits/receives various kinds of information to and from the reading device 3 via the communication I/F 25. For example, if the reading start button is pressed, the communication control function transmits instruction information for instructing a reading start to the reading device 3. In addition, the communication control function receives the article code transmitted from the reading device 3. In addition, if the reading end button is pressed, the communication control function transmits instruction information for instructing a reading end to the reading device 3. In addition, if loading and unloading registration is ended by a loading and unloading management function, the communication control function transmits instruction information for instructing a registration end to the reading device 3.

When checking an inventory list with each of the articles corresponding to the article code transmitted from the reading device 3, the loading and unloading management function registers the article code on the inventory list as an article to be loaded or unloaded. A database for registration may be configured to be included in the storage unit 24 of the information processing device 2 and/or to be included in an external device capable of communicating with the tag reading device 1.

The controller 30 (CPU) of the reading device 3 realizes an open/close state acquisition function, a reader/writer control function, a movable mechanism control function, and the communication control function by cooperating with programs stored in the storage unit 33.

The open/close state acquisition function acquires the open/close state information showing whether the lid 11 is in the open state or in the close state by cooperating with the open/closed sensor 32.

The reader/writer control function performs reading of the RFID tag and writing to the RFID tag via the RFID antennas 15-1 and 15-2 by controlling the reader/writer unit 31.

Specifically, in a case where a reading start is instructed by the information processing device 2 and the open/close state information acquired by the open/close state acquisition function indicates the lid 11 is closed, the reader/writer control function first starts reading (initiates a reading cycle). It is assumed that the tag information (here, an article code) read from the RFID tag can be transmitted from the reader/writer control function to the information processing device 2 at any time.

In addition, if a reading end is instructed from the information processing device 2, the reader/writer control function ends reading by the reader/writer unit 31. If a registration end is instructed from the information processing device 2, the reader/writer control function controls the reader/writer unit 31 and starts writing (initiates a writing cycle) of a registered flag. Here, it is assumed that the registered flag is information indicated an end of loading and unloading registration and is written in a predetermined storage area included in the RFID tag.

Further, in a case where the lid 11 is in the open state during a period from a reading start of the RFID tag to writing of the registered flag, the reader/writer control function ends reading and executes a reset process for resetting of the article codes read so far. It is assumed that the article codes transmitted to the information processing device 2 are also reset by the reset process. If the reader/writer control function confirms that the lid 11 is again in the close state, the reader/writer control function executes reading of the RFID tag again.

Accordingly, even in a case where an article having an unread RFID tag attached thereto is added to the cargo C (or reading room 12) before an end of a loading and unloading process, it is possible to read the articles more reliably. A screen for notifying that the lid 11 is in the open state may be displayed on the display 23 by notifying the information processing device 2 that the lid 11 is in the open state.

The movable mechanism control function controls the motor driving units 35-1 and 35-2 during the reading of the RFID tags.

Specifically, the movable mechanism control function drives the motor driving units 35-1 and 35-2 so that the moving stages 164-1 and 164-2 move in a first and a second operation patterns (described below) during execution of the reading cycle (or writing cycle) by the reader/writer control function.

In the first operation pattern, when control of the reading cycle (or writing cycle) is started, the reader/writer control function drives the motor driving units 35-1 and 35-2 and moves the moving stages 164-1 and 164-2 in a forward direction at a constant velocity. When the moving stages 164-1 and 164-2 are moved to an end portion of a screw shaft 160 (or close to the end portion of the screw shaft 160), the moving stages 164-1 and 164-2 are then returned from this end portion, by being moved in a reverse direction at a constant velocity, and moved to the other end portion of the screw shafts 160-1 and 160-2 (or close to the other end portion of the screw shafts 160-1 and 160-2). When the moving stages 164-1 and 164-2 are moved towards the other end portion of the screw shafts 160-1 and 160-2, the moving stages 164-1 and 164-2 are returned from the end portion or by being moved in a forward direction at a constant velocity. This procedure is repeated until the moving stages 164-1 and 164-2 stop. If control of the reading cycle (or writing cycle) is ended by the reader/writer control function, driving of the motor driving units 35-1 and 35-2 is stopped and the moving stages 164-1 and 164-2 are stopped on the spot.

In addition, it is assumed that moving speeds of the moving stages 164-1 and 164-2 are kept below a speed at which the RFID antenna 15 and the RFID tag can communicate with each other.

In the second operation pattern, moving the moving stages 164-1 and 164-2 by a predetermined distance and stopping is repeated by intermittently driving the motor driving units 35-1 and 35-2 from a start to an end of control of the reading cycle (or writing cycle). In this case, it is preferable to set the moving speeds of the moving stages 164-1 and 164-2 to high speeds and to set a stop time to a time which is sufficient to permit communication between the RFID antennas 15-1 and 15-2 and the RFID tag.

In addition, in a case where the moving stages 164-1 and 164-2 are always started from a fixed start position (for example, one end of the screw shafts 160-1 and 160-2), control of the motor driving units 35-1 and 35-2 is driven and the motor driving units 35-1 and 35-2 are controlled so that the moving stages 164-1 and 164-2 return to an initial position (a start position of reading or writing) after an end of the reading cycle (or writing cycle) by the reader/writer control function. In this case, the stepping motors 162-1 and 162-2 are rotated forward or backward to return to an initial position by controlling the motor driving units 35-1 and 35-2 with the same controlled variable (e.g., number of pulses) as from a movement start to a movement end.

In addition, in a case where a sensor for positioning is provided, the motor driving units 35-1 and 35-2 are driven, the stepping motors 162-1 and 162-2 are rotated forward or backward, the moving stages 164-1 and 164-2 are detected at a position of the sensor, so that driving of the motor driving units 35-1 and 35-2 is stopped or the driving is switched to driving from a forward rotation to a reverse rotation.

For example, in a process in which the moving stages 164-1 and 164-2 are returned to a start position, driving of the motor driving units 35-1 and 35-2 is stopped by detection of the moving stages 164-1 and 164-2 by a sensor of the start position. In addition, in a process of the reading cycle or the writing cycle, when the moving stages 164-1 and 164-2 are detected by a sensor at a return point, driving of the motor driving units 35-1 and 35-2 is switched from a forward rotation to a reverse rotation (or from a reverse rotation to a forward rotation).

In addition, since the RFID antennas 15-1 and 15-2 can acquire tag information from the RFID tag by reciprocating the screw shafts 160-1 and 160-2 one time if a radio wave environment is favorable, the moving stages 164-1 and 164-2 may be set so that the moving stages 164-1 and 164-2 always start at a fixed start position, the screw shafts 160-1 and 160-2 are reciprocated and return at the start position, and the moving stages 164-1 and 164-2 are stopped. In this case, driving of the motor driving units 35-1 and 35-2 is stopped without waiting until control of the reading cycle (or writing cycle) is ended.

The communication control function controls the communication I/F 34 and transmits and receives various kinds of information to and from the information processing device 2 via the communication I/F 34. For example, the communication control function receives instruction information for instructing a reading start received from the information processing device 2. In addition, the communication control function transmits the article code read from the RFID tag by the reader/writer control function to the information processing device 2. In addition, the communication control function receives instruction information for instructing a reading end received from the information processing device 2. In addition, the communication control function receives instruction information for instructing a registration end received from the information processing device 2.

Next, operations of the information processing device 2 and the reading device 3 will be described.

Figure 4:
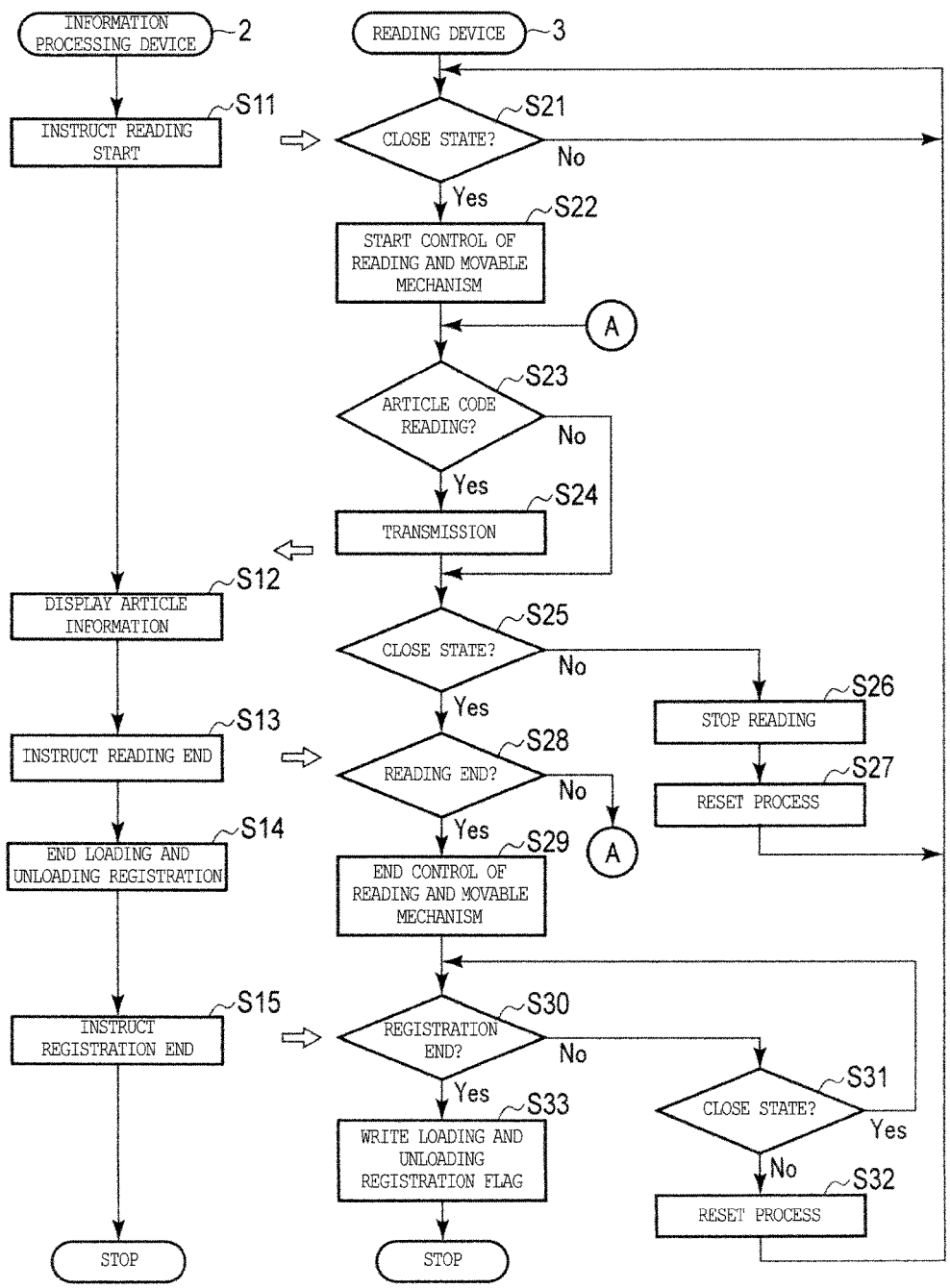
FIG. 4 is a flowchart for explaining aspects of an operational example of a tag reading device according to an embodiment

FIG. 4 is a flowchart for explaining operation examples of the information processing device 2 and the reading device 3 in the present embodiment.

An operator of the tag reading device 1 opens the lid 11 and allows the reading room 12 to accommodate the cargo C containing the article. Then, the operator operates the reading start button displayed on the display 23.

If an operation of the reading start button is received, the controller 21 of the information processing device 2 transmits instruction information for instructing a reading start to the reading device 3 (Act S11).

If instruction information for instructing the reading start is received, the controller 30 of the reading device 3 determines whether or not the lid 11 is in the closed state based on the open/close state information (Act S21).

Here, if the controller 30 determines that the lid 11 is in the open state, the controller 30 waits until the lid 11 is placed into the closed state (Act S21; No). During a waiting time of Act S21, the controller 30 may display a screen for urging the closing of the lid 11 by cooperating with the controller 21 (in particular, the display control function) of the information processing device 2.

If it is determined that the lid 11 is in the closed state (Act S21; Yes), the controller 30 starts reading of the RFID tag (Act S22). Specifically, the controller 30 controls the reader/writer unit 31 to start communication (for a reading cycle) with the RFID tag and starts driving of the motor driving units 35-1 and 35-2. That is, the moving stages 164-1 and 164-2 are started (for moving RFID antennas 15-1 and 15-2). Movement control of the moving stages 164-1 and 164-2 will be described below.

Then, the controller 30 determines whether or not the article code has been read from the RFID tag through the RFID antennas 15-1 and 15-2 by the reader/writer unit 31 (Act S23). Here, in a case where the article code is read (Act S23; Yes), the controller 30 sequentially transmits the article code to the information processing device 2 by the communication control function (Act S24).

Continuously in Act S25, the controller 30 determines whether or not the lid 11 is in the closed state based on the open/close state information (Act S25). In a case where it is determined that the lid 11 is in the closed state (Act S25; Yes), the controller 30 determines whether or not a reading end has been instructed by the information processing device 2 (Act S28). Here, in a case where the reading end has not been instructed (Act S28; No), the process is returned to Act S23.

In Act S23, in a case where the article code is not read (Act S23; No), the process is moved to Act S25.

In addition, in Act S25, in a case where it is determined that the lid 11 is in the open state (Act S25; No), the controller 30 stops reading of the RFID tag (Act S24). Specifically, in Act S24, the controller 30 controls the reader/writer unit 31 to stop communication with the RFID tag and stops driving of the motor driving units 35-1 and 35-2. That is, a moving stage 164 (RFID antennas 15-1 and 15-2) is stopped.

Following a process of Act S24, the controller 30 performs a reset process to reset the article codes already read so far (Act S25) and the process is returned to Act S21 again.

In a case where reading is started with the reading room 12 empty (no RFID tags), a loop of Acts S23 to S25 and S28 could continue indefinitely without reading any RFID tags. In order to avoid this situation, in a case where a fixed time (for example, 5 seconds) is elapsed without reading any RFID tags, the controller 30 may compulsorily stop reading and movable mechanism control. In addition, even in a case where the loop of Acts S23 to S25 and S28 is executed a predetermined number of times, the controller 30 may compulsorily stop reading of the RFID tag and movable mechanism control. In this case, the controller 30 preferably displays a message indicating that the RFID tag cannot be read by cooperating with the controller (in particular, the display control function) of the information processing device 2.

If the article code is received from the reading device 3, the controller 21 of the information processing device 2 reads the article information corresponding to the article code from the article master list and displays the article information on the display 23 (Act S12).

If the operator confirms by reference to the article information displayed on the display 23 that all of the articles placed in the cargo C are displayed, the operator presses the reading end button displayed on the display 23. If an operation instruction from the reading end button is received, the controller 21 transmits instruction information for instructing a reading end to the reading device 3 (Act S13).

If the reading end instruction is received, the controller 30 of the reading device 3 determines that the reading end has been instructed (Act S28; Yes). Then, the controller 30 stops reading of the RFID tag (Act S29). Specifically, the controller 30 controls the reader/writer unit 31 to stop communication with the RFID tag and stops driving of the motor driving units 35-1 and 35-2. That is, the moving stages 164-1 and 164-2 (RFID antennas 15-1 and 15-2) are stopped.

Continuously, the controller 30 determines whether or not a registration end is instructed from the tag reading device 1 (Act S30). In a case where the registration end is not instructed (Act S30; No), the controller 30 determines whether or not the lid 11 is in the close state based on the open/close state information (Act S31).

Here, in a case where the lid 11 is in the close state (Act S31; Yes), the process is returned to Act S30. In addition, in a case where it is determined that the lid 11 is in the open state (Act S31; No), the controller 30 performs the same reset process as Act S25 (Act S32) and returns to Act S21.

If the loading and unloading registration process for each of the articles displayed as a candidate to be registered is ended (Act S14), the controller 21 performs registration of each of the articles. The controller 21 transmits instruction information for instructing a registration end to the reading device 3 (Act S15) and ends the process.

If an instruction for ending registration is received, the controller 30 determines that the registration end has been instructed (Act S30; Yes). The controller 30 controls the reader/writer unit 31 to write the registered flag to the RFID tag of each of the articles (Act S33) and then ends this process.

Specifically, in Act S33, the controller 30 starts communication (a writing cycle) with the RFID tag and starts to control driving of the motor driving units 35-1 and 35-2. If writing of the registered flag to all of the RFID tags is completed, the controller 30 controls the reader/writer unit (e.g., tag reader-writer) 31 to end communication (the writing cycle) with the RFID tag and stops driving of the motor driving units 35-1 and 35-2.

During writing of the registered flag, the controller 30 may display a screen for informing a user/operator that the lid 11 is to be kept closed. The controller 30 may display such a screen by cooperating with the controller 21 (in particular, the display control function) of the tag reading device 1. In addition, in a case where writing of the registered flag has ended, the controller 30 may display a screen for urging the opening of the lid 11.

Next, movement control of the moving stages 164-1 and 164-2 by the reading device 3 of the present embodiment will be described. In the present embodiment, when the RFID antennas 15-1 and 15-2 are moved by the moving mechanisms 16-1 and 16-2, the RFID antennas 15-1 and 15-2 can be controlled to have different reciprocating cycles of respective movable lengths. Hereinafter, Configuration Examples 1 to 3 will be described.

Configuration Example 1

FIGS. 5A to 5F are plan views for explaining movement control by Configuration Example 1 of the present embodiment. FIGS. 5A to 5F show only the moving mechanisms 16-1 and 16-2 provided in the reading device 3 (depicted in FIG. 2).

In Configuration Example 1, travel lengths of the moving stages 164-1 and 164-2 (RFID antennas 15-1 and 15-2) in the moving mechanisms 16-1 and 16-2 are different from each other. In Configuration Example 1, the travel length of the moving stage 164-2 provided on a side surface of the reading device 3 is shorter than the travel length of the moving mechanism 16-1. In addition, initial positions of the moving stages 164-1 and 164-2 are controlled to correspond to each other and moving speeds of the moving stages 164-1 and 164-2 are controlled to be equal to each other. Accordingly, the RFID antennas 15-1 and 15-2 are controlled to have different reciprocating cycles.

FIGS. 5A to 5F show positions and moving directions of the moving stages 164-1 and 164-2 (RFID antennas 15-1 and 15-2), which change over time when the moving mechanisms 16-1 and 16-2 are operated.

Figure 5A:
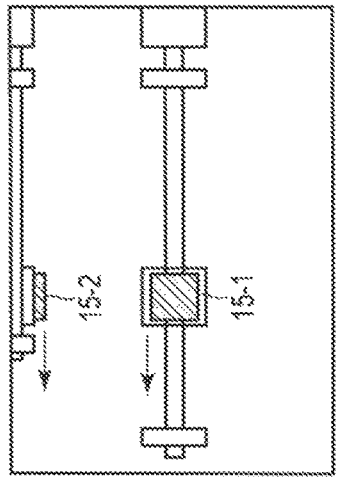
FIGS. 5A, 5B, 5C, 5D, 5E, and 5F are plan views for explaining aspects of movement control for Configuration Example 1.
Figure 5B:
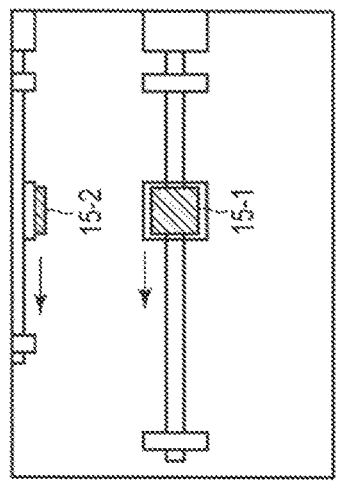
Figure 5C:
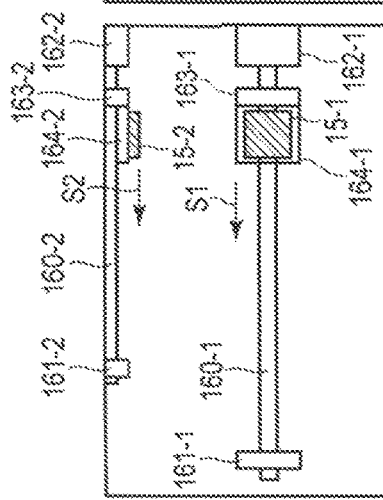

FIG. 5A shows the initial positions of the moving stages 164-1 and 164-2. As shown in FIGS. 5B and 5C, if the moving mechanisms 16-1 and 16-2 are operated, the moving stages 164-1 and 164-2 move in the same direction (left direction in FIGS. 5A to 5F) at the same speed (S1 and S2). Accordingly, positions of the RFID antennas 15-1 and 15-2 are substantially equal along a depth direction of the reading room 12 for some time.

Figure 5D:
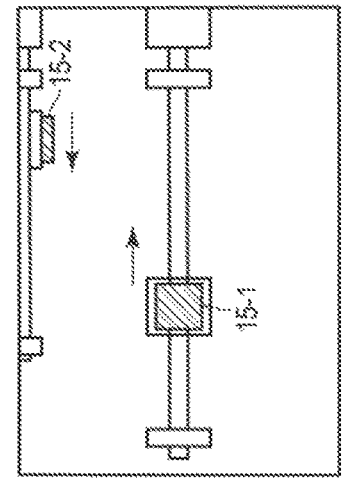

After this, since the travel length of the moving stage 164-2 is shorter than the travel length of the moving stage 164-1, the moving stage 164-2 reaches an end portion first and the direction of the moving stage 164-2 switches to a reverse direction (right direction in FIGS. 5A to 5F) as shown in FIG. 5D. The moving stage 164-1 continues to move in the same direction. Accordingly, when the moving stage 164-2 reaches the end portion, the positions of the RFID antennas 15-1 and 15-2 become different from each other along the depth direction of the reading room 12.

Figure 5E:
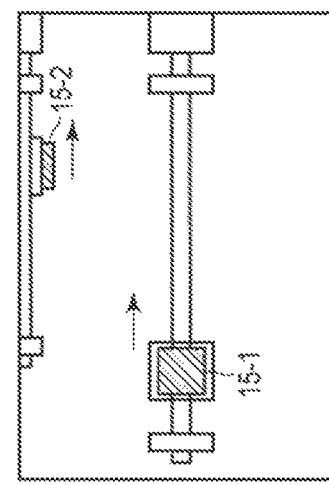
Figure 5F:
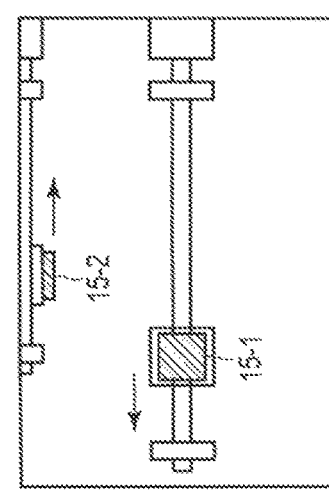

When the moving stage 164-1 ultimately reaches an end portion, the moving direction of the moving stage 164-1 is switched to the reverse direction (right direction in FIGS. 5A to 5F) as shown in FIG. 5E. The moving stages 164-1 and 164-2 are moved at the same speed. For this reason, as shown in FIG. 5F, the moving stage 164-2 returns to its starting point (initial portion) first and the direction of the moving stage 164-2 reverses again (to the left direction in FIGS. 5A to 5F). Accordingly, the RFID antennas 15-1 and 15-2 respectively have different reciprocating cycles within their available travel ranges, so that positions along the depth direction of the reading room 12 become different each time the RFID antennas 15-1 and 15-2 reciprocate.

That is, a place in which intensity of a radio wave, which is a composite wave due to a reflected wave from the RFID antennas 15-1 and 15-2, the case 10, and the like in the reading room 12, is strong is constantly varied. Therefore, according to the reading device 3 including such a configuration, it is possible to avoid missing the reading of any RFID tag accommodated in the reading room 12 and to collectively read information, such as the article code, from the RFID tags attached to all of the articles in the cargo C using the RFID antennas 15-1 and 15-2.

In Configuration Example 1, the moving speeds (S1 and S2) of the RFID antennas 15-1 and 15-2 are the same. Since reciprocating cycles of the RFID antennas 15-1 and 15-2 are different if times for the RFID antennas 15-1 and 15-2 respectively to move from an initial position to an end portion are different from each other, the moving speeds (S1 and S2) may also be different from each other.

Configuration Example 2

FIGS. 6A to 6D are plan views for explaining movement control by Configuration Example 2 in the present embodiment. FIGS. 6A to 6D show only the moving mechanisms 16-1 and 16-2 provided in the reading device 3 in the same manner as FIGS. 5A to 5F.

In Configuration Example 2, travel lengths of the moving stages 164-1 and 164-2 (RFID antennas 15-1 and 15-2) in the moving mechanisms 16-1 and 16-2 are the same. In addition, initial (starting) positions of the moving stages 164-1 and 164-2 are controlled to be equal to each other and moving speeds (S1 and S2) of the moving stages 164-1 and 164-2 are respectively controlled to be different from each other. Accordingly, the RFID antennas 15-1 and 15-2 are controlled to have different reciprocating cycles by use of different movement speeds.

FIGS. 6A to 6D show positions and moving directions of the moving stages 164-1 and 164-2 (RFID antennas 15-1 and 15-2) which change over time when the moving mechanisms 16-1 and 16-2 are operated.

FIG. 6A shows the initial positions of the moving stages 164-1 and 164-2. As shown in FIG. 6B, if the moving mechanisms 16-1 and 16-2 are operated, the moving stages 164-1 and 164-2 move in the same direction (left direction in FIGS. 6A to 6D). For example, the moving mechanism 16-1 moves the moving stage 164-1 at the speed S1 and the moving mechanism 16-2 moves the moving stage 164-2 at the speed S2. The speed S1 is, for example, twice the speed S2. Accordingly, positions of the RFID antennas 15-1 and 15-2 are different positions along a depth direction of the reading room 12 immediately after an operation of the moving mechanisms 16-1 and 16-2 is started.

After this, since the movable lengths of the moving stages 164-1 and 164-2 are the same, the moving stage 164-1 (RFID antenna 15-1) reaches an end portion first and the travel direction of the moving stage 164-1 is switched to a reverse direction (right direction in FIGS. 6A to 6D) as shown in FIG. 6C. The moving stage 164-2 (RFID antenna 15-2) is continues to move in the same direction.

When the moving stage 164-2 reaches an end portion, the travel direction of the moving stage 164-2 is switched to a reverse direction (right direction in FIGS. 6A to 6D) as shown in FIG. 6D 1. In addition, since the moving stage 164-1 moves at speed twice that of the moving stage 164-2, the moving stage 164-1 reaches the initial position at almost the same timing as the moving stage 164-2 reaches the end portion and the travel direction of the moving stage 164-1 is reversed again (left direction in FIGS. 6A to 6D). Accordingly, the RFID antennas 15-1 and 15-2 respectively have different reciprocating cycles within movable ranges, so that positions in the depth direction of the reading room 12 become different every time the RFID antennas 15-1 and 15-2 reciprocate.

In this manner, it is possible to obtain substantially the same operational effect as in Configuration Example 1 described above.

Configuration Example 3

FIGS. 7A to 7D are plan views for explaining movement control by Configuration Example 3 in the present embodiment. FIGS. 7A to 7D show only the moving mechanisms 16-1 and 16-2 provided in the reading device 3 in the same manner as FIGS. 6A to 6D.

In Configuration Example 3, travel lengths of the moving stages 164-1 and 164-2 (RFID antennas 15-1 and 15-2) in the moving mechanisms 16-1 and 16-2 are the same. In addition, initial positions of the moving stages 164-1 and 164-2 are the same, end portions for the moving stages 164-1 and 164-2 are not the same as in Configuration Examples 1 and 2 and are rather at a position near a center of the movable range instead of an end of the overall range. In addition, travel speeds (S1 and S2) of the moving stages 164-1 and 164-2 are respectively controlled to be different from each other and directions for starting a movement of the moving stages 164-1 and 164-2 are controlled to be different from each other (reversed from each other). Accordingly, the RFID antennas 15-1 and 15-2 are controlled to have different reciprocating cycles.

FIGS. 7A to 7D show positions and travel directions of the moving stages 164-1 and 164-2 (RFID antennas 15-1 and 15-2) which change over time when the moving mechanisms 16-1 and 16-2 are operated.

Figure 7A:
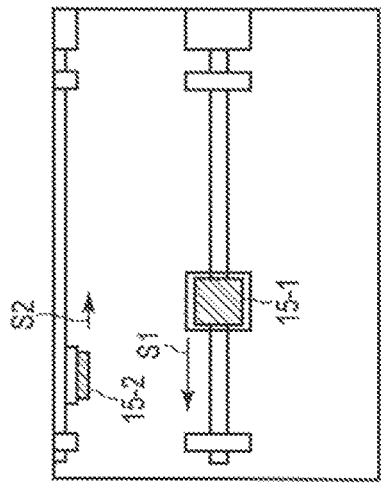
FIGS. 7A, 7B, 7C, and 7D are plan views for explaining aspects of movement control for Configuration Example 3.

FIG. 7A shows the initial positions of the moving stages 164-1 and 164-2. As shown in FIG. 7A, the initial positions of the moving stages 164-1 and 164-2 are near the center of the movable range. As shown in FIG. 7A, when the moving mechanism 16-1 is operated, the moving stage 164-1 moves in a right direction at a speed S1. As shown in FIG. 7A, when the moving mechanism 16-2 is operated, the moving stage 164-2 moves in a left direction at a speed S2. The speed S1 is, for example, twice the speed S2. Accordingly, positions of the RFID antennas 15-1 and 15-2 are different positions along a depth direction of the reading room 12 immediately after an operation of the moving mechanisms 16-1 and 16-2 is started.

Figure 7B:
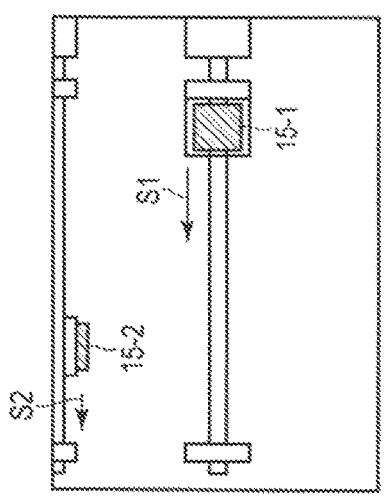

After this, since the travel lengths of the moving stages 164-1 and 164-2 are the same, the moving stage 164-1 (RFID antenna 15-1) reaches an end portion first and the moving direction of the moving stage 164-1 is switched to a reverse direction (left direction in FIGS. 7A to 7D) as shown in FIG. 7B. The moving stage 164-2 (RFID antenna 15-2) continues to move in the same direction at this time.

Figure 7C:
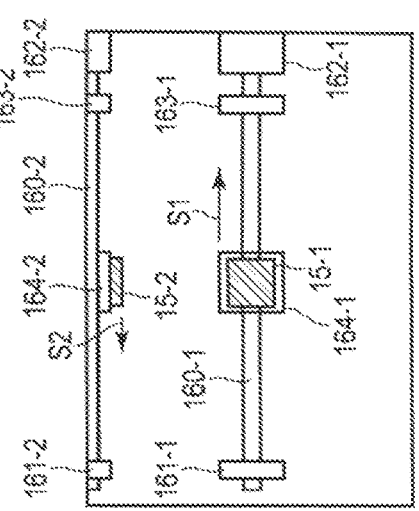
Figure 7D:
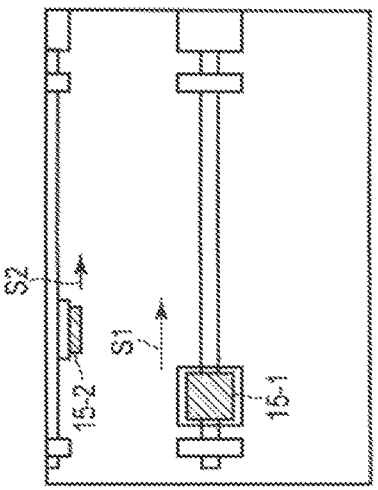

When the moving stage 164-2 reaches an end portion, the moving direction of the moving stage 164-2 reverses direction (to the right direction in FIGS. 7A to 7D) as shown in FIG. 7C in the same manner as the moving stage 164-1. In addition, since the moving stage 164-1 moves at a speed twice that of the moving stage 164-2, the moving stage 164-1 reaches its initial position (near the center) at almost the same timing as the moving stage 164-2 reaches its end portion. The moving stage 164-1 then further moves in the same direction beyond its initial position. When the moving stage 164-1 reaches an end portion, the moving direction of the moving stage 164-1 reverses direction (right direction in FIGS. 7A to 7D) as shown in FIG. 7D.

Accordingly, the RFID antennas 15-1 and 15-2 respectively have different reciprocating cycles within travel ranges, so that positions along the depth direction of the reading room 12 become different every time the RFID antennas 15-1 and 15-2 reciprocate.

In this manner, it is possible to obtain the same operational effect as in Configuration Example 1 described above.

In Configuration Examples 2 and 3, the speed S1 is twice the speed S2. However, a ratio of the moving speed S1 to the moving speed S2 may be other than double and times from an initial position to an end position may become different from each other.

In the present embodiment described above, reading of the RFID tag and movement control of the RFID antennas 15-1 and 15-2 are started according to an operation instruction from the operator. However, the present embodiment is not limited thereto. As another example embodiment, the reading of the RFID tag and the movement control of the RFID antennas 15-1 and 15-2 may be started when a state of the lid 11 is switched to the close state without requiring a separate operation instruction from the operator.

In addition, in the examples described above, in a case where the lid 11 is opened during reading and writing process of the RFID tag, reading is ended and a reset process is executed. However, the present embodiment is not limited to this. As another example embodiment, a lock mechanism for maintaining the close state of the lid 11 may be provided between the case 10 and the lid 11 and the lid 11 may be controlled not to be opened by operation of the lock mechanism. Specifically, during a period from the reading start to the writing of the registered flag, the closed state is maintained so that the lid 11 cannot be opened. The lock mechanism can be controlled by the reader/writer control function. Accordingly, it is possible to prevent an unread RFID tag from being inserted into the cargo C (e.g., reading room 12) at an improper time.

In addition, in the example described above, reading of the RFID tag is ended according to an instruction from the operator. However, the present embodiment is not limited thereto. As another example embodiment, if an RFID tag is read for an expected number (number of articles) input by the operator, the reading may be automatically ended when the expected number of tags has been read.

In addition, a communication method with the RFID tag of the embodiment described above adopts a radio wave method. However, other electromagnetic induction systems may instead be adopted.

In addition, in the embodiment described above, an example in which two RFID antennas 15-1 and 15-2 are provided in the reading device 3 and are moved by the moving mechanisms 16-1 and 16-2 is shown. However, RFID antennas equal to three or more may be provided along with associated moving mechanisms for the additional RFID antennas may be provided.

In addition, in a configuration in FIG. 2, the moving mechanism 16-1 is provided on a lower side of the cargo C. However, the moving mechanism 16-1 may be provided on a side surface, a back surface, an upper side, or the like of the cargo C. In addition, the moving mechanism 16-2 may likewise be provided on the side surface, the back surface, the upper side, or the like of the cargo C. In any case, it is preferable that the reading surface of the RFID antenna is directed toward the cargo C side (article side).

In addition, in the embodiment described above, the RFID antennas 15-1 and 15-2 are configured to reciprocate along a straight line shape, but the RFID antennas may be configured to move along a curve shape as one possible example of a configuration of the moving mechanisms 16-1 and 16-2 or may adopt other arbitrarily shaped configurations. In addition, moving mechanisms which move the RFID antennas in two direction, moving mechanisms which move the RFID antennas in three direction, moving mechanisms which tilt the RFID antennas, or the like may be used.

In addition, a mechanism using a ball screw is adopted in the moving mechanisms 16-1 and 16-2 of the example embodiments, but other mechanisms may be adopted in other embodiments. For example, air pressure or a magnet may be used for movement.

Further, an example of the RFID antenna 15-1 for movement provided in the moving mechanism 16-1 of a lower portion of the pedestal of the reading device 3 and the RFID antenna 15-2 provided in the moving mechanism 16-2 of a side surface of the reading device 3 is described as an example. However, a positional relationship between the moving mechanisms 16-1 and 16-2 is not limited thereto. For example, the respective moving mechanisms 16-1 and 16-2 may be disposed on opposing surfaces and one of the moving mechanisms 16-1 and 16-2 may be installed on a back side of the reading device 3.

In addition, moving mechanisms equal to three or more may be provided and at least one of which may be configured not to move an RFID antenna. In addition, a moving mechanism which initially does not move an RFID antenna may be dynamically switched into moving mechanism that does move an RFID antenna. That is, moving mechanisms may be inactive (unmoving) for portions of a reading process, but active during other portions of the reading process. In addition, any one of a plurality of RFID antennas provided in the reading device 3 may be a fixed, stationary antenna for which no moving mechanism is provided.

In addition, in the example embodiment described above, the moving mechanisms 16-1 and 16-2 are disposed so that the travel directions of the RFID antennas 15-1 and 15-2 are parallel. However, the moving directions need not be parallel.

In the example embodiments described above, information processing related to the article at a time of loading and unloading of the article has been described. However, examples may similarly be applied to information processing for managing exchange of articles between a stockroom (warehouse) and a shop floor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag reading device, comprising:
a chamber in which an article having a wireless tag attached thereto can be stored;
a first antenna for outputting a signal for reading information from the wireless tag attached to the article stored in the chamber;
a second antenna for outputting the signal for reading information from the wireless tag attached to the article stored in the chamber;
a first moving mechanism configured to change a distance between the wireless tag and the first antenna during a reading process at a first cycle for reading information from the wireless tag; and
a second moving mechanism configured to change a distance between the wireless tag and the second antenna at a second cycle during the reading process, the second cycle being different from the first cycle.

2. The wireless tag reading device according to claim 1, wherein
the first antenna is attached to the first moving mechanism,
the second antenna is attached to the second moving mechanism, and
a travel distance of the first moving mechanism during the reading process is different from a travel distance of the second moving mechanism during the reading process.

3. The wireless tag reading device according to claim 2, wherein the first moving mechanism and the second moving mechanism respectively move the first antenna and the second antenna along parallel paths.

4. The wireless tag reading device according to claim 1, wherein
the first moving mechanism moves at a first speed during the reading process, and
the second moving mechanism moves at a second speed different from the first speed during the reading process.

5. The wireless tag reading device according to claim 1, wherein the first moving mechanism has a fixed travel length that is less than a fixed travel length of the second moving mechanism.

6. The wireless tag reading device according to claim 1, wherein
the first moving mechanism moves the first antenna in a first direction at a start of the reading process, and
the second moving mechanism moves the second antenna in a second direction that is opposite the first direction at the start of the reading process.

7. The wireless tag reading device according to claim 1, further comprising:
a casing around the chamber, the casing being comprised of a first radio wave blocking material and including an opening through which the article can be placed in the chamber; and
a lid configured to cover the opening when closed and comprising a second radio wave blocking material.

8. The wireless tag reading device according to claim 7, further comprising:
a sensor to detect whether the lid is an opened state, wherein the sensor outputs a signal for stopping the reading process when the lid is detected in the opened state.

9. The wireless tag reading device according to claim 7, further comprising:
a locking mechanism configured to hold the lid in a closed state during the reading process.

10. A tag reading device, comprising:
a chamber in which an article having a wireless tag attached thereto can be stored;
a casing around the chamber, the casing being comprised of a first radio wave blocking material and including an opening through which the article is placed in the chamber;
a lid configured to cover the opening when closed and comprising a second radio wave blocking material;
a first antenna for outputting a signal for reading information from the wireless tag attached to the article stored in the chamber;
a second antenna for outputting the signal for reading information from the wireless tag attached to the article stored in the chamber;
a first moving mechanism configured to change a distance between the wireless tag and the first antenna during a reading process for reading information from the wireless tag; and
a tag reader-writer configured to supply the signal for reading information from the wireless tag attached to the article stored in the chamber to the first and second antennas.

11. The tag reading device according to claim 10, further comprising:
a controller configured to:
receive an instruction indicating a start of the reading process,
cause the tag reader-writer to supply the signal for reading information from the wireless tag during the reading process, and
cause the first moving mechanism to move during the reading process.

12. The tag reading device according to claim 11, further comprising:
a second moving mechanism configured to change a distance between the wireless tag and the second antenna during the reading process, wherein
the controller is further configured to cause the second moving mechanism to move during the reading process.

13. The tag reading device according to claim 11, further comprising:
a sensor to detect whether the lid is an opened state, wherein the sensor outputs a control signal to controller when the lid is detected in the opened state, wherein the controller is further configured to cause:
the first moving mechanism to stop moving, and
the tag reader-writer to stop supplying the signal for reading information from the wireless tag.

14. The tag reading device according to claim 11, further comprising:
   a lock mechanism for holding the lid in a closed state during the reading process, wherein
   the controller is further configured to maintain the lock mechanism in a locked state until the reading process is ended.

15. The tag reading device according to claim 10, further comprising:
   a second moving mechanism configured to change a distance between the wireless tag and the second antenna during the reading process.

16. The tag reading device according to claim 15, wherein the first moving mechanism has fixed travel distance that is less than a fixed travel distance of the second moving mechanism.

17. The tag reading device according to claim 15, further comprising:
   a controller configured to cause:
   the first moving mechanism at a first speed during the reading process, and
   the second moving mechanism at a second speed that is different from the first speed during the reading process.

18. The tag reading device according to claim 15, further comprising:
   a controller configured to cause:
      the first antenna to move in a first direction at a start of the reading process, and
      the second antenna to move in a second direction opposite the first direction at the start of the reading process, wherein
   the first antenna is attached to the first moving mechanism, and
   the second antenna is attached to the second moving mechanism.

19. A radio frequency identification tag reader, comprising:
   a chamber in which an article having a radio frequency identification (RFID) tag attached thereto is stored;
   a casing around the chamber, the casing being comprised of a first radio wave blocking material and including an opening through which the article can be placed in the chamber;
   a lid configured to cover the opening when closed and comprising a second radio wave blocking material;
   a first antenna for outputting a signal for reading information from the RFID tag attached to the article stored in the chamber, the first antenna being movable with respect to the RFID tag during a reading process for reading information from the RFID tag;
   a second antenna for outputting the signal for reading information from the RFID tag attached to the article stored in the chamber, the second antenna being movable with respect to the RFID tag during the reading process for reading information from the RFID tag;
   a tag reader-writer configured to supply the signal for reading information from the RFID tag attached to the article stored in the chamber to the first and second antennas; and
   a controller configured to control movements of a first moving mechanism and a second moving mechanism during the reading process such that signals from the first and second antennas constructively interfere at a plurality of different positions within the chamber during the reading process.

* * * * *